United States Patent
Williams et al.

(10) Patent No.: US 8,771,798 B2
(45) Date of Patent: Jul. 8, 2014

(54) ANTI-FOULING COMPOSITIONS WITH A FLUORINATED ALKYL- OR ALKOXY- CONTAINING POLYMER OR OLIGOMER

(75) Inventors: David Neil Williams, Newcastle upon Tyne (GB); Nigel Ivor Edward Shewring, Newcastle upon Tyne (GB); Adrian James Lee, Newcastle upon Tyne (GB)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 13/572,204

(22) Filed: Aug. 10, 2012

(65) Prior Publication Data

US 2012/0309882 A1 Dec. 6, 2012

Related U.S. Application Data

(63) Continuation of application No. 10/103,080, filed on Mar. 21, 2002, now abandoned.

(60) Provisional application No. 60/294,028, filed on May 29, 2001.

(30) Foreign Application Priority Data

Mar. 21, 2001 (EP) ..................... 01201071

(51) Int. Cl.
*B05D 1/20* (2006.01)
*C08K 5/06* (2006.01)

(52) U.S. Cl.
USPC ............ 427/387; 427/385.5; 524/366

(58) Field of Classification Search
CPC ... C09D 5/1637; C09D 5/1675; C09D 5/1606
USPC ........ 424/407, 638, 123; 514/835.8; 524/366; 427/385.5, 387
See application file for complete search history.

(56) References Cited

U.S. PATENT DOCUMENTS

| | | | |
|---|---|---|---|
| 3,154,460 A | 10/1964 | Graner | |
| 3,702,778 A | 11/1972 | Mueller et al. | |
| 4,025,693 A | 5/1977 | Milne | |
| 4,077,936 A | 3/1978 | Tanaka et al. | |
| 4,200,711 A | 4/1980 | Onoue et al. | |
| 4,851,475 A * | 7/1989 | Federici et al. | 525/104 |
| 4,895,881 A | 1/1990 | Bigner | |
| 4,898,895 A | 2/1990 | Masuoka et al. | |
| 5,434,198 A * | 7/1995 | Meurer et al. | 523/210 |
| 5,439,673 A * | 8/1995 | Murray | 424/70.12 |
| 6,313,193 B1 | 11/2001 | Simendinger, III | |

FOREIGN PATENT DOCUMENTS

| | | |
|---|---|---|
| EP | 0 700 975 A1 | 3/1996 |
| EP | 0 754 738 A1 | 1/1997 |
| EP | 0 874 032 A2 | 10/1998 |
| EP | 0 903 389 A1 | 3/1999 |
| FR | 2 537 985 A1 | 6/1984 |
| GB | 1 581 727 A | 12/1980 |
| GB | 2 141 436 A | 12/1984 |
| WO | WO-92/00357 A1 | 1/1992 |
| WO | WO-93/13179 A1 | 7/1993 |
| WO | WO-95/18188 A1 | 7/1995 |
| WO | WO-99/33927 A1 | 7/1999 |
| WO | WO-00/14166 A1 | 3/2000 |

OTHER PUBLICATIONS

English Translation, Laid Open Patent Gazette, Laid Open No. 1994-322294 (JP06-322294A), Laid Open Date: Nov. 22, 1994, pp. 1-14.
Glass: Liquid or Solid Science vs. an Urban Legwend, Mar. 18, 2002 (pp. 1-5).
.D4350-90(200)e1 Standard test Method for Determining Whether a Material is a Liquid or a Solid, Mar. 18, 2002 (p. 1 of 1).
Derwent Abstract No. 004069408, abstracting French Patent No. 2 537 985, Jun. 22, 1984.
English Translation of JP 06-322294 Detailed Description and Claims' 7 pages (Nov. 22, 1994).
English Translation of JP 08-134381 Detailed Description and Claims; 11 pages (May 28, 1996).
English Translation, Laid Open Patent Gazette, Laid Open No, 1994-322294 (JP06-322294A), Laid Open Date: Nov. 22, 1994, pp. 1-14.
Glass: Liquid or Solid Science vs. An Urban Legend, Mar. 18, 2002 (pp. 1-5).
Japanese Patent Abstract 06-322294; 1 page (Nov. 22, 1994).
Japanese Patent Abstract 08-1324381; 1 page (May 28, 1996).
Japanese Patent Abstract 61-296076; 1 page (Dec. 26, 1986).
Teflon Industrial Coatings—Typical Properties, Feb. 27, 2002 (pp. 1-4)European Seard Report for EP 01 20 1071, dated Aug. 14, 2001.
Article on Poly(trifluorochloroethylene) in chemyg.com/EN/xz/xz1, Nov. 2, 2008.

\* cited by examiner

*Primary Examiner* — Blessing M Fubara
(74) *Attorney, Agent, or Firm* — Kenyon & Kenyon LLP

(57) ABSTRACT

An anti-fouling composition which comprises a cured or cross-linked polymer free of perfluoropolyether moieties and a fluid fluorinated alkyl- or alkoxy-containing polymer or oligomer. Preferably, the fluorinated alkyl- or alkoxy-containing polymer or oligomer comprises a repeating unit of the general formula:

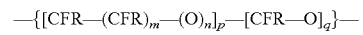

—{[CFR—(CFR)$_m$—(O)$_n$]$_p$—[CFR—O]$_q$}— wherein n is 0 or 1, m is an integer from 0 to 4, R independently is H, F, Cl, Br, or CF$_3$, and the ratio q/p is 0-10, and the fluorine-free polymer is an organosiloxane-containing polymer comprising a repeating unit of the general structure —[SiR$_1$R$_2$—O]—, wherein R$_1$ and R$_2$ are independently hydrogen, alkyl, aryl, aralkyl, or a vinyl group.

9 Claims, No Drawings

ANTI-FOULING COMPOSITIONS WITH A FLUORINATED ALKYL- OR ALKOXY-CONTAINING POLYMER OR OLIGOMER

CROSS-REFERENCE TO RELATED APPLICATIONS

This application is a continuation of U.S. patent application Ser. No. 10/103,080, filed on Mar. 21, 2002, and claims the benefit of European Patent Application No. 01201071.6, filed Mar. 21, 2001, and U.S. Provisional Patent Application No. 60/294,028, filed May 29, 2001, each of which are incorporated herein by reference in their entireties.

FIELD OF THE INVENTION

The invention pertains to an anti-fouling composition which comprises a cured or cross-linked polymer free of perfluoropolyether moieties and a fluid fluorinated alkyl- or alkoxy-containing polymer or oligomer, and to a method for inhibiting fouling in an aquatic environment.

BACKGROUND OF THE INVENTION

Man-made structures such as boat hulls, buoys, drilling platforms, dry dock equipment, oil production rigs, and pipes which are immersed in water are prone to fouling by aquatic organisms such as green and brown algae, barnacles, mussels, and the like. Such structures are commonly of metal, but may also comprise other structural materials such as concrete. This fouling is a nuisance on boat hulls, because it increases frictional resistance during movement through the water, the consequence being reduced speeds and increased fuel costs. It is a nuisance on static structures such as the legs of drilling platforms and oil production rigs, firstly because the resistance of thick layers of fouling to waves and currents can cause unpredictable and potentially dangerous stresses in the structure, and, secondly, because fouling makes it difficult to inspect the structure for defects such as stress cracking and corrosion. It is a nuisance in pipes such as cooling water intakes and outlets, because the effective cross-sectional area is reduced by fouling, with the consequence that flow rates are reduced.

The commercially most successful methods of inhibiting fouling have involved the use of anti-fouling coatings containing substances toxic to aquatic life, for example tributyltin chloride or cuprous oxide. Such coatings, however, are being regarded with increasing disfavour because of the damaging effects such toxins may have if released into the aquatic environment. There is accordingly a need for non-fouling coatings which do not release markedly toxic materials.

It has been known for many years, for example as disclosed in GB 1,307,001 and U.S. Pat. No. 3,702,778, that silicone rubber coatings resist fouling by aquatic organisms. It is believed that such coatings present a surface to which the organisms cannot easily adhere, and they can accordingly be called fouling release rather than anti-fouling coatings. Silicone rubbers and silicone compounds generally have very low toxicity. The disadvantage of this anti-fouling system when applied to boat hulls is that although the accumulation of marine organisms is reduced, relatively high vessel speeds are needed to remove all fouling species. Thus, in some instances, it has been shown that for effective release from a hull that has been treated with such a polymer, it is necessary to sail with a speed of at least 14 knots. For this reason silicone rubbers have gained limited commercial success and there is a need for improvement of the anti-fouling and fouling release properties of these environmentally benign coatings.

FR 2 537 985 discloses an anti-fouling coating composition comprising a methyl organosiloxane resin, a silicone elastomer, polytetrafluoroethylene, an acrylic binder, and a solvent or diluent. Since polytetrafluoroethylene is solid at room temperature, this document does not describe a coating composition comprising a fluid fluorinated alkyl-containing polymer or oligomer.

EP 0 903 389 discloses an anti-fouling composition comprising a photocatalytic oxide, a silicone resin or silica, and a water-repellent fluororesin. Tetrafluoroethylene is mentioned as a preferred hydrophobic fluororesin, and in the examples polytetrafluoroethylene particles have been used. This document does not describe a coating composition comprising a fluid fluorinated alkyl-containing polymer or oligomer.

SUMMARY OF THE INVENTION

The present invention provides an anti-fouling composition that satisfies the requirements, including low surface energy and suitable elastomeric properties, which further decrease the settlement of fouling organisms and their adhesion strength. It was found that an anti-fouling composition which comprises a cured or cross-linked polymer free of perfluoropolyether moieties and a fluid fluorinated alkyl- or alkoxy-containing polymer or oligomer has advantageous properties with regard to the known non-biocidal anti-fouling compositions.

DETAILED DESCRIPTION OF THE INVENTION

Within the framework of the present invention, a fluid material is defined in conformity with ASTM (1996) D4359-90: Standard Test Method for Determining Whether a Material Is a Liquid or a Solid. In this test method the material under test is held in a tightly closed can at 38° C. The lid is removed and the can inverted. The flow of the material from the can is observed to determine whether it is a solid or a liquid. A material that flows for a total of 50 mm or less within 3 min is considered a solid. Otherwise it is considered a liquid.

Preferably, the fluid fluorinated alkyl- or alkoxy-containing polymer or oligomer has a viscosity between 5 and 1,500 cSt at 25° C.

Preferably, the fluid fluorinated alkyl- or alkoxy-containing polymer or oligomer comprises a repeating unit of the general formula:

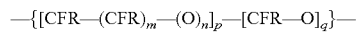

wherein n is 0 or 1, m is an integer from 0 to 4, R independently is H, F, Cl, Br, or $CF_3$, and the ratio q/p is 0-10. Preferably, the average weight MW is 400-40,000, and more preferably 500-10,000. Most preferred are such polymers wherein R is F or $CF_3$.

In other preferred anti-fouling compositions the repeating unit is selected from at least one of —[$CF_2$—$CF_2$—$CF_2$—$CF_2$—O]— and —[$CF(CF_3)$—$CF_2$—O]—, and more preferably —{[O—$CF_2$—$CF_2$]$_p$—[O—$CF_2$]$_q$}—, wherein the ratio q/p is 1.25-2.0.

The anti-fouling composition of the invention comprises a cured or cross-linked polymer that is free of polyperfluoropolyether moieties. Preferably, this polymer is an organosiloxane-containing polymer. More preferably, the organosiloxane-containing polymer comprises a repeating unit of the general structure —[$SiR_1R_2$—O]—, wherein $R_1$ and $R_2$ are independently selected from hydrogen, alkyl, aryl, aralkyl, and a vinyl group. It is particularly preferred that $R_1$ and $R_2$ are independently selected from methyl and phenyl. Another preferred organosiloxane-containing polymer is a polymer wherein $R_1$ and $R_2$ are methyl.

A number of coatings with good anti-fouling performance have been formulated and tested.

Binders:

Suitable binders are for instance condensation curable polydimethylsiloxanes (di-hydroxy-functional) cross-linked with tetraethyl orthosilicate (dibutyltin dilaurate catalysed). A siloxane-acrylic hybrid polymer was also tested as a binder. The binders are free of perfluoropolyether moieties. Preferably, they contain less than 10 wt. % of fluorine, more preferably less than 1 wt. %. Most preferred are binders that do not contain detectable amounts of fluorine at all.

The most preferred binder is a polymer containing siloxane groups which is substantially free of carbon in the backbone, e.g. PDMS (wherein substantially free of carbon means that less than 1 wt. % of carbon is present). Other suitable polymers are those as disclosed in WO 99/33927, particularly the polymers disclosed on page 12, lines 23-31, viz, an organohydrogen polysiloxane or a polydiorganosiloxane. The polysiloxane may, for example, comprise a copolymer of diorganosiloxane units with organohydrogen siloxane units and/or with other diorganosiloxane units, or a homopolymer of organohydrogen siloxane units or of diorganosiloxane units.

Polysiloxanes that can be cross-linked by a hydrosilylation reaction can also be used. Such polymers are known as "hydride silicones" and are disclosed, for instance, in EP 874032-A2 on page 3, viz, a polydiorganosiloxane of the formula $R'—(SiOR'_2)_m—SIR'_3$, wherein each R' independently is a hydrocarbon or fluorinated hydrocarbon radical, at least two R' radicals per molecule being unsaturated, or hydrogen, at least two R' radicals per molecule being hydrogen, and m has an average value in the range of about 10-1,500. Cyclic polydiorganosiloxanes analogous to those of the formula above may also be employed. The hydride silicone preferably is a hydrogen polydimethylsiloxane.

The preferred number average molecular weight range for the hydride silicone is in the range of about 1,000-28,000, corresponding to a value of m in the range of about 13-380.

The polymers according to the invention are obtained from these binders by curing or cross-linking with suitable cross-linkers.

Polymer or Oligomer:

Any fluid fluorinated alkyl- or alkoxy-containing polymer or oligomer is suitable.

Examples are:

a) Linear and trifluoromethyl branched fluorine end-capped perfluoropolyethers (e.g., Fomblin Y®, Krytox K® fluids, or Demnum S® oils);

b) Linear di-organo (OH) end-capped perfluoropolyethers (e.g., Fomblin Z DOL®, Fluorolink E®);

c) Low MW polychlorotrifluoroethylenes (e.g., Daifloil CTFE® fluids).

In all cases the fluorinated alkyl- or alkoxy-containing polymer or oligomer is not reactive towards the binder and does not take part in any cross-linking reaction.

Other mono- and diorgano-functional end-capped fluorinated alkyl- or alkoxy-containing polymers or oligomers can also be used (e.g., carboxy-, ester-functional fluorinated alkyl- or alkoxy-containing polymers or oligomers).

Fillers:

Examples of fillers that can be used in the coating composition according to the present invention are barium sulphate, calcium sulphate, calcium carbonate, silicas or silicates (such as talc, feldspar, and china clay), aluminium paste/flakes, bentonite or other clays. Some fillers may have a thixotropic effect on the coating composition. The proportion of fillers may be in the range of from 0 to 25% by weight, based on the total weight of the coating composition.

Pigments:

Examples of pigments that can be used in the coating composition according to the present invention are black iron oxide and titanium dioxide. The proportion of pigments may be in the range of from 0 to 10% by weight, based on the total weight of the coating composition.

Catalysts:

Examples of catalysts that can be used include the carboxylic acid salts of various metals, such as tin, zinc, iron, lead, barium, and zirconium. The salts preferably are salts of long-chain carboxylic acids, for example dibutyltin dilaurate, dibutyltin dioctoate, iron stearate, tin (II) octoate, and lead octoate. Further examples of suitable catalysts include organobismuth and organotitanium compounds and organo-phosphates such as bis(2-ethyl-hexyl) hydrogen phosphate. Other possible catalysts include chelates, for example dibutyltin acetoacetonate. Further, the catalyst may comprise a halogenated organic acid which has at least one halogen substituent on a carbon atom which is in the α-position relative to the acid group and/or at least one halogen substituent on a carbon atom which is in the β-position relative to the acid group, or a derivative which is hydrolysable to form such an acid under the conditions of the condensation reaction.

Cross-Linking:

The presence of a cross-linker for the resin is only necessary if the resin cannot be cured by condensation. This depends on the functional groups that are present in the resin. In general, when the resin comprises alkoxy groups, the presence of a cross-linker is not necessary. If the resin comprises alkoxy-silyl groups, in general the presence of a small amount of a condensation catalyst and water is sufficient to achieve full cure of the coating after application. For these compositions, normally atmospheric moisture is sufficient to induce curing, and as a rule it will not be necessary to heat the coating composition after application.

The optionally present cross-linker can be a cross-linking agent comprising a functional silane and/or one or more oxime groups. Examples of such cross-linking agents are presented in WO99/33927. Mixtures of different cross-linkers can also be used.

Solvent:

The process for forming the curable polysiloxane- or non-perfluoropolyether-containing polymer is most conveniently carried out using a solution of the material in a non-reacting volatile solvent. Suitable solvents include aromatic hydrocarbons, alcohols, ketones, esters, and mixtures of the above with one another or an aliphatic hydrocarbon. In order to minimise the use of solvent on environmental grounds, it is advantageous to use as concentrated a solution as possible which is compatible with the coating technique employed. In principle, the maximum solids content may be as high as 90% by weight or even more, but in general the maximum practicable solids content will range from 70-80% by weight.

Application:

The coating composition can be applied by normal techniques, such as brushing, roller coating, or spraying (airless and conventional). To achieve proper adhesion to the substrate it is preferred to apply the anti/non-fouling coating composition to a primed substrate. The primer can be any conventional primer/sealer coating system. Good results were found, in particular with respect to adhesion, when using a primer that comprises an acrylic siloxy-functional polymer, a solvent, a thixotropic agent, a filler, and, optionally, a moisture scavenger. Such a primer is disclosed in WO 99/33927. It is also possible to apply the coating composition according to the present invention on a substrate containing an aged anti-fouling coating layer. Before the coating composition according to the present invention is applied to such an aged layer, this old layer is cleaned by high-pressure water washing to remove any fouling. The primer disclosed in WO 99/33927 can be used as a tie coat between the aged coating layer and the coating composition according to the present invention. After the coating has been cured, it can be immersed immediately and gives immediate anti-fouling and fouling release protection. As indicated above, the coating composition according to the present invention has very good anti-fouling and fouling release properties. This makes these coating compositions very suitable for use as anti-fouling or non-fouling coatings for marine applications. The coating can be used for both dynamic and static structures, such as boat hulls, buoys, drilling platforms, oil production rigs, and pipes which are immersed in water. The coating can be applied on any substrate that is used for these structures, such as metal, concrete, wood or fibre-reinforced resin.

The invention will be elucidated with reference to the following examples.

The kinematic viscosity of the fluids used in the examples can be determined according to the following method. The time is measured in seconds for a fixed volume of liquid to flow under gravity through the capillary of a calibrated viscometer (such as an Ubbelohde viscometer) or the orifice of a flow cup under a reproducible driving head and at a closely controlled temperature.

Such tests are described for example in Test Method D445-01 Standard Test Method for Kinematic Viscosity of Transparent and Opaque Liquids (the Calculation of Dynamic Viscosity), ISO 3104-IP 71-BS 2000-DIN 51550, and Test Method D5125-97 Standard Test Method for Viscosity of Paints and Related Materials by ISO Flow Cups. The kinematic viscosity is the product of the measured flow time and the calibration constant of the viscometer.

Kinematic viscosity is a measure of the resistance to gravity flow of a fluid, the pressure head being proportional to its density. Multiplying the kinematic viscosity with the density of the product at 20° C. gives the dynamic viscosity.

Example 1

A three-pack coating composition was prepared with the formulation:
Base
33 g α,ω,-hydroxy-functional polydimethyl siloxane (dynamic viscosity 35 poise)
3 g Daifloil #10® (a chlorotrifluoroethylene polymer, ex Daikin Industries, kinematic viscosity 150 cST (measured in conformity with JIS K 6893))
5 g xylene
Curing Agent
1.7 g tetraethyl orthosilicate
5 g xylene
Catalyst Solution
0.28 g dibutyltindilaurate
2.54 g 2,4-pentanedione Example 2

A three-pack coating composition was prepared with the formulation:
Base
33 g, α,ω-hydroxy-functional polydimethyl siloxane (dynamic viscosity 35 poise)
3 g Demnum S20® (a perfluoropolyether, ex Daikin Industries, kinematic viscosity 29 cSt (measured in conformity with ASTM D2270-86))
5 g xylene
Curing Agent
1.7 g tetraethyl orthosilicate
5 g xylene
Catalyst Solution
0.28 g dibutyltin dilaurate
2.54 g 2,4-pentanedione Example 3

A three-pack coating composition was prepared with the formulation:
Base
65 g α,ω)-hydroxy-functional polydimethyl siloxane (dynamic viscosity 35 poise)
9 g xylene
Curing Agent
3.0 g tetraethylorthosilicate
8.0 g Fomblin Y-25® (a perfluorinated polyether, ex Ausimont, kinematic viscosity 250 cSt (measured in conformity with ASTM D445))
9.5 g xylene
Catalyst Solution
0.5 g dibutyl tindilaurate
4.8 g 2,4-pentanedione Example 4

A three-pack coating composition was prepared with the formulation:
Base
65 g α,ω-hydroxy-functional polydimethyl siloxane (dynamic viscosity 35 poise)
9 g xylene
Curing Agent
3.0 g tetraethyl orthosilicate
3.0 g Fluorolink E® (a perfluorated polyether, ex Ausimont, kinematic viscosity 145 cSt (measured in conformity with ASTM D445))
9.5 g xylene
Catalyst Solution
0.5 g dibutyltin dilaurate
4.8 g 2,4-pentanedione Example 5

A two-pack coating composition was prepared with the formulation:
Base
92 g m-polymer FR355® (silicone/acrylic hybrid polymer, ex Wacker)
5 g Fomblin M30® (a perfluorinated polyether, ex Ausimont, kinematic viscosity 280 cSt (measured in conformity with ASTM D445))
Curing Agent
2.8 g T914® catalyst/curing agent (ex Wacker)

Example 6

A one-pack coating composition was prepared with the formulation:
30.0 g acrylic siloxy-functional polymer (acrylic polymer B according to WO 99/33927, p. 29)

3.0 g Fluorolink E® (a perfluorated polyether, ex Ausimont, kinematic viscosity 145 cSt (measured in conformity with ASTM D445))
10.0 g trimethyl benzene
0.5 g 2-ethylhexyl hydrogenphosphate Example 7

A two-pack coating composition was prepared with the formulation:
100 g α,ω-hydroxy-functional polydimethyl siloxane (dynamic viscosity 35 poise)
6 g Krytox K7® (a perfluoropolyether, ex DuPont, kinematic viscosity 8.3 cSt (measured in conformity with ASTM D445))
3 g air floated silica (Aerosil®)
10 g titanium dioxide (Tiona 472®)
6 g methyl-tris(methylethylketoxime)silane
Catalyst Solution
15 g trimethyl benzene
0.08 g dibutyltin dilaurate Example 8

A one-pack coating composition was prepared with the formulation:
55 g α,ω-hydroxy-functional functional polydimethyl siloxane (dynamic viscosity 35 poise)
2.5 g methyltrimethoxy silane
2.20 g air floated silica (Aerosil®)
5 g titanium dioxide (Tiona 472®)
2 g Demnum S200® (a perfluoropolyether, ex Daikin Industries, kinematic viscosity 203 cSt (measured in conformity with ASTM D2270-86))
1.00 g titanium ethylacetoacetonate
29.40 g trimethyl benzene Example 9

Anti-Fouling Testing

The compositions of Examples 3, 4, and 5 were applied by brush onto wood substrates primed with an anti-corrosive undercoat. For static anti-fouling assessment the coated substrates were immersed in a tropical marine environment known for its heavy hard-shelled and soft-bodied animal fouling and a European marine estuary known for its accumulated fouling was significantly less than that of control substrates coated only with the anticorrosive primer, and less than that of a standard substrate coated with a silicone coating not containing a fluorinated fluid additive but maintained under the same conditions over the same period of time. Any fouling on coatings of Examples 3-5 could be removed very easily by light rubbing, whereas accumulated fouling on the control substrates could not be removed in a similar way.

Quantitative Fouling Properties

| Example | % Slime fouling | % Weed fouling | % Soft-bodied fouling | % hard-bodied fouling | % Total fouling | Fouling release rating | Weeks Immersed |
|---|---|---|---|---|---|---|---|
| Immersed at tropical site ||||||||
| 3 | 0 | 0 | 30 | 2 | 32 | 1 | 10 |
| ST | 0 | 0 | 23 | 11 | 34 | 1 | 10 |
| CT | 0 | 0 | 47 | 19 | 66 | 2 | 10 |
| Immersed at estuary site ||||||||
| 3 | 23.2 | 0 | 1 | 18.3 | 42.5 | 1 | 13 |
| ST | 29 | 0 | 1.3 | 14.7 | 45 | 1 | 13 |
| CT | 12.5 | 0 | 11.7 | 43.3 | 67.5 | 4 | 13 |
| Immersed at tropical site ||||||||
| 4 | 0 | 0 | 23 | 3 | 26 | N/A | 14 |
| ST | 0 | 0 | 31 | 9 | 40 | N/A | 14 |
| CT | 0 | 0 | 56 | 25 | 81 | N/A | 14 |
| 5 | 0 | 0.8 | 42.5 | 55 | 98.3 | 1 | 11 |
| ST | 0 | 1.7 | 34.2 | 59.2 | 95 | 1 | 11 |
| CT | 0 | 3.3 | 13.3 | 79.2 | 95.8 | 1 | 11 |

ST = Standard, which is a silicone coating formulation not containing fluorinated fluid.
CT = control
N/A = not analysed
*Fouling release properties rated according to ease with which fouling is removed by rubbing with a soft brush: 1—very easy, 2—fairly easy, 3—quite difficult, 4—very difficult.

The invention claimed is:
1. A method of inhibiting fouling of a substrate in an aquatic environment, comprising applying an anti-fouling composition to the substrate, and curing or cross-linking the anti-fouling composition to provide an anti-fouling coating composition which comprises a cured or cross-linked polymer, free of perfluoropolyether moieties, and a fluid fluorinated alkyl- or alkoxy-containing polymer or oligomer having an average-weight molecular weight of 400-40,000 comprising a repeating unit of the general formula:

—{[CFR—(CFR)$m$-(O)$n$]$p$-[CFR—O]$q$}- wherein n is 0 or 1, m is an integer from 0 to 4, R independently is H, F, Cl, Br, or CF3, and the ratio q/p is 0-10.
2. The method of claim 1, wherein R is F or CF3.
3. The method of claim 1, wherein the repeating unit is —[CF2-CF2-CF2-O]— and/or —[CF(CF3)-CF2-O]—.
4. The method of claim 1, wherein the repeating unit has the formula —{[CF2-CF2-O]p-[CF2-O]q)- and the ratio q/p is 1.25-2.0.
5. The method of claim 1, wherein the cured or cross-linked polymer comprises a repeating unit of the general structure —[SiR1R2-O]—, wherein R1 and R2 are independently hydrogen, alkyl, aryl, aralkyl, or a vinyl group.
6. The method of claim 5, wherein R1 and R2 are independently methyl or phenyl.
7. The method of claim 5, wherein R1 and R2 are methyl.
8. The method of claim 1, wherein the cured or cross-linked polymer comprises a cured or cross-linked organosiloxane-containing polymer.
9. The method of claim 1, wherein the average-weight molecular weight of the fluorinated alkyl- or alkoxy-containing polymer or oligomer is 500-10,000.

* * * * *